US006354256B1

United States Patent
Ohanian et al.

(10) Patent No.: US 6,354,256 B1
(45) Date of Patent: Mar. 12, 2002

(54) COLD STARTING AID SYSTEM FOR AN INTERNAL COMBUSTION ENGINE AND METHOD OF START-UP SEQUENCING FOR SAME

(75) Inventors: Vahe Ohanian, Thornhill; Gabriel Gorscovoz, Bolton, both of (CA)

(73) Assignee: Mobile Climate Control Industries, Inc., Toronto (CA)

( * ) Notice: Subject to any disclaimer, the term of this patent is extended or adjusted under 35 U.S.C. 154(b) by 0 days.

(21) Appl. No.: 09/476,968

(22) Filed: Dec. 30, 1999

(30) Foreign Application Priority Data

Dec. 24, 1999 (CA) .............................. 2293134

(51) Int. Cl.[7] .............................................. F02M 31/00
(52) U.S. Cl. ................... 123/179.21; 123/549; 123/556
(58) Field of Search ........................ 123/179.21, 179.6, 123/549, 555, 554, 556, 557

(56) References Cited

U.S. PATENT DOCUMENTS

| 3,802,511 | A |   | 4/1974  | Good, Jr. ............... 169/30 |
| 3,844,356 | A |   | 10/1974 | Allen et al. ............ 169/75 |
| 3,998,274 | A |   | 12/1976 | Liautaud ................ 169/89 |
| 4,019,584 | A |   | 4/1977  | Allmendinger .......... 169/74 |
| 4,505,336 | A |   | 3/1985  | Thevis et al. ........... 169/85 |
| 4,567,948 | A |   | 2/1986  | Rozniecki .............. 169/76 |
| 4,620,598 | A |   | 11/1986 | Reeder ................ 169/30 |
| 4,715,448 | A |   | 12/1987 | McCulloch ............ 169/62 |
| 4,815,541 | A |   | 3/1989  | Arrington ............. 169/74 |
| 4,856,596 | A |   | 8/1989  | Hamernik ............. 169/74 |
| 4,862,968 | A |   | 9/1989  | Woodman ............. 169/75 |
| 4,903,645 | A | * | 2/1990  | Borger ............... 123/549 |
| 5,040,497 | A | * | 8/1991  | Dingle ............... 123/549 |
| 5,063,998 | A |   | 11/1991 | Quinn ................ 169/65 |
| 5,347,966 | A | * | 9/1994  | Mahon ............... 123/556 |
| 5,408,973 | A | * | 4/1995  | Spangjer ............. 123/556 |
| 5,460,228 | A |   | 10/1995 | Butler ............... 169/30 |
| 5,645,129 | A |   | 7/1997  | Renna ............... 169/51 |
| 5,694,906 | A | * | 12/1997 | Lange et al. .......... 123/549 |
| 5,775,432 | A |   | 7/1998  | Burns et al. .......... 169/74 |
| 5,816,331 | A |   | 10/1998 | Vivier ............... 169/30 |
| 5,836,289 | A | * | 11/1998 | Thring ............... 123/549 |
| 5,862,786 | A | * | 1/1999  | Fuchs et al. .......... 123/556 |
| 5,894,832 | A | * | 4/1999  | Hogi et al. ........... 123/549 |
| 6,109,247 | A | * | 8/2000  | Hunt ................. 123/549 |
| 6,138,645 | A | * | 10/2000 | Joppig et al. ......... 123/556 |
| 6,176,226 | B1 | * | 1/2001  | Nines et al. .......... 123/549 |

\* cited by examiner

Primary Examiner—Marguerite McMahon
(74) Attorney, Agent, or Firm—Harness, Dickey & Pierce, P.L.C.

(57) ABSTRACT

A cold starting system and power management software consisting of an air heater system, a fuel heater system, a controller with microprocessor and related software, a series of devices comprising of switches, indicators, solenoids and sensors, is used as an aid to assist start up of air cooled combustion engines in extreme temperature environments. Both the air and fuel heater systems include electrically powered heating elements. The power management software controls the sequential operation of individual system components.

25 Claims, 11 Drawing Sheets

| SUS | 2 | | | | | Fuel ON Solenoid | Fuel OFF Solenoid |
|---|---|---|---|---|---|---|---|
| Item Power (w) | | Fuel Pump 80 | Glow Plug 460 | Injector 200 | Starter 800 | 1 | 0 |
| 0 | | | | | | | |
| 3 | | 1 | 1 | 1 | 0 | | |
| 6 | | 1 | 1 | 1 | 0 | | |
| 9 | | 0 | 1 | 1 | 0 | | |
| 12 | | 0 | 0 | 0 | 1 | | |
| 15 | | 0 | 1 | 1 | 1 | | |
| 18 | | 1 | 0 | 0 | 1 | | |
| 21 | | 1 | 1 | 1 | 1 | | |
| 24 | | 1 | 1 | 1 | 1 | | |
| 27 | | 1 | 1 | 0 | 1 | | |
| 30 | | 1 | 1 | 0 | 1 | | |
| 33 | | 0 | 1 | 1 | 0 | 1 | 0 |
| 36 | | 0 | 1 | 1 | 0 | | |
| 39 | | 0 | 1 | 1 | 0 | | |
| 42 | | 1 | 0 | 0 | 1 | | |
| 45 | | 1 | 1 | 1 | 1 | | |
| 48 | | 1 | 0 | 0 | 1 | | |
| 51 | | 1 | 1 | 1 | 1 | | |
| 54 | | 1 | 1 | 1 | 1 | | |
| 57 | | 1 | 1 | 0 | 1 | | |
| 60 | | 1 | 1 | 0 | 1 | 0 | 1 |
| Sec | | 42 | 48 | 36 | 42 | | |
| Amps | | 3.333 | 19.167 | 5.333 | 33.333 | | |
| Amp-Hour | | 0.039 | 0.256 | 0.053 | 0.389 | | |
| Total Amp-Hrs | | 0.767 | | | | | |

| SUS | 1 | | | |
|---|---|---|---|---|
| Item<br>Power (w) | Fuel Pump<br>80 | Glow Plug<br>460 | Injector<br>200 | Starter<br>800 |
| 0 | | | | |
| 3 | 1 | 0 | 0 | 1 |
| 6 | 1 | 0 | 0 | 1 |
| 9 | 1 | 0 | 0 | 1 |
| 12 | 1 | 0 | 0 | 1 |
| 15 | 0 | 0 | 0 | 0 |
| 18 | 1 | 0 | 0 | 1 |
| 21 | 1 | 0 | 0 | 1 |
| 24 | 1 | 0 | 0 | 1 |
| 27 | 1 | 0 | 0 | 1 |
| 30 | 1 | 0 | 0 | 1 |
| 33 | 1 | 0 | 0 | 1 |
| 36 | 1 | 0 | 0 | 1 |
| 39 | 1 | 0 | 0 | 1 |
| 42 | 1 | 0 | 0 | 1 |
| 45 | 0 | 0 | 0 | 0 |
| 48 | 1 | 0 | 0 | 1 |
| 51 | 1 | 0 | 0 | 1 |
| 54 | 1 | 0 | 0 | 1 |
| 57 | 1 | 0 | 0 | 1 |
| 60 | 1 | 0 | 0 | 1 |
| Sec | 54 | 0 | 0 | 54 |
| Amps | 3.333 | 19.167 | 5.333 | 33.333 |
| Amp-Hour | 0.050 | 0.000 | 0.000 | 0.500 |
| Total Amp-Hrs | 0.550 | | | |

| Fuel ON<br>Solenoid | Fuel OFF<br>Solenoid |
|---|---|
| 1 | 0 |
| 1 | 0 |
| 0 | 1 |

| SUS | 4 | | | |
|---|---|---|---|---|
| Item<br>Power (w) | Fuel Pump<br>80 | Glow Plug<br>460 | Injector<br>200 | Starter<br>800 |
| 0 | | | | |
| 3 | 1 | 1 | 1 | 0 |
| 6 | 1 | 1 | 1 | 0 |
| 9 | 0 | 1 | 1 | 0 |
| 12 | 0 | 1 | 1 | 0 |
| 15 | 0 | 0 | 0 | 1 |
| 18 | 1 | 1 | 0 | 1 |
| 21 | 1 | 1 | 1 | 1 |
| 24 | 1 | 1 | 0 | 1 |
| 27 | 1 | 1 | 1 | 1 |
| 30 | 1 | 1 | 0 | 1 |
| 33 | 0 | 0 | 0 | 0 |
| 36 | 0 | 1 | 1 | 0 |
| 39 | 0 | 1 | 1 | 0 |
| 42 | 1 | 1 | 1 | 0 |
| 45 | 1 | 0 | 0 | 1 |
| 48 | 1 | 1 | 0 | 1 |
| 51 | 1 | 1 | 1 | 1 |
| 54 | 1 | 1 | 0 | 1 |
| 57 | 1 | 1 | 1 | 1 |
| 60 | 1 | 1 | 0 | 1 |
| Sec | 42 | 51 | 33 | 36 |
| Amps | 3.333 | 19.167 | 8.333 | 33.333 |
| Amp-Hour | 0.039 | 0.272 | 0.076 | 0.333 |
| Total Amp-Hrs | 0.720 | | | |

| Fuel ON<br>Solenoid | Fuel OFF<br>Solenoid |
|---|---|
| 1 | 0 |
| 1 | 0 |
| 0 | 1 |

| SUS | 3 | | | | | Fuel ON Solenoid | Fuel OFF Solenoid |
|---|---|---|---|---|---|---|---|
| Item<br>Power (w) | | Fuel Pump<br>80 | Glow Plug<br>460 | Injector<br>200 | Starter<br>800 | 1 | 0 |
| 0 | | | | | | | |
| 3 | | 1 | 1 | 1 | 0 | | |
| 6 | | 1 | 1 | 1 | 0 | | |
| 9 | | 0 | 1 | 1 | 0 | | |
| 12 | | 0 | 1 | 1 | 0 | | |
| 15 | | 0 | 0 | 0 | 1 | | |
| 18 | | 1 | 0 | 0 | 1 | | |
| 21 | | 1 | 1 | 1 | 1 | | |
| 24 | | 1 | 1 | 1 | 1 | | |
| 27 | | 1 | 1 | 0 | 1 | | |
| 30 | | 1 | 1 | 0 | 1 | | |
| 33 | | 0 | 0 | 0 | 0 | 1 | 0 |
| 36 | | 0 | 0 | 1 | 0 | | |
| 39 | | 0 | 1 | 1 | 0 | | |
| 42 | | 1 | 1 | 0 | 0 | | |
| 45 | | 1 | 0 | 0 | 1 | | |
| 48 | | 1 | 1 | 1 | 1 | | |
| 51 | | 1 | 1 | 1 | 1 | | |
| 54 | | 1 | 1 | 1 | 1 | | |
| 57 | | 1 | 1 | 1 | 1 | | |
| 60 | | 1 | 1 | 1 | 1 | 0 | 1 |
| Sec | | 42 | 45 | 39 | 36 | | |
| Amps | | 3.333 | 19.167 | 8.333 | 33.333 | | |
| Amp-Hour | | 0.039 | 0.240 | 0.090 | 0.333 | | |
| Total Amp-Hrs | | 0.702 | | | | | |

| SUS | 6 | | | | | Fuel ON Solenoid | Fuel OFF Solenoid |
|---|---|---|---|---|---|---|---|
| Item Power (w) | | Fuel Pump 80 | Glow Plug 460 | Injector 200 | Starter 800 | 1 | 0 |
| 0 | | | | | | | |
| 3 | | 1 | 0 | 1 | 0 | | |
| 6 | | 1 | 1 | 1 | 0 | | |
| 9 | | 0 | 1 | 1 | 0 | | |
| 12 | | 0 | 1 | 1 | 0 | | |
| 15 | | 0 | 1 | 1 | 0 | | |
| 18 | | 1 | 0 | 0 | 1 | | |
| 21 | | 1 | 1 | 0 | 1 | | |
| 24 | | 1 | 1 | 1 | 1 | | |
| 27 | | 1 | 1 | 1 | 1 | | |
| 30 | | 1 | 1 | 1 | 1 | | |
| 33 | | 0 | 0 | 1 | 0 | 1 | 0 |
| 36 | | 0 | 1 | 1 | 0 | | |
| 39 | | 0 | 1 | 1 | 0 | | |
| 42 | | 1 | 0 | 0 | 1 | | |
| 45 | | 1 | 1 | 0 | 1 | | |
| 48 | | 1 | 1 | 1 | 1 | | |
| 51 | | 1 | 1 | 1 | 1 | | |
| 54 | | 1 | 1 | 1 | 1 | | |
| 57 | | 1 | 1 | 0 | 1 | | |
| 60 | | 1 | 1 | 0 | 1 | 0 | 1 |
| Sec | | 42 | 48 | 42 | 36 | | |
| Amps | | 3.333 | 19.167 | 8.333 | 33.333 | | |
| Amp-Hour | | 0.039 | 0.256 | 0.097 | 0.333 | | |
| Total Amp-Hrs | | 0.725 | | | | | |

| SUS | 8 | | | |
|---|---|---|---|---|
| Item<br>Power (w) | Fuel Pump<br>80 | Glow Plug<br>460 | Injector<br>200 | Starter<br>800 |
| 0 | | | | |
| 3 | 1 | 1 | 1 | 0 |
| 6 | 1 | 1 | 1 | 0 |
| 9 | 0 | 1 | 1 | 0 |
| 12 | 0 | 1 | 1 | 0 |
| 15 | 0 | 1 | 1 | 0 |
| 18 | 0 | 1 | 1 | 0 |
| 21 | 0 | 1 | 1 | 0 |
| 24 | 0 | 1 | 1 | 0 |
| 27 | 1 | 0 | 0 | 1 |
| 30 | 1 | 1 | 1 | 1 |
| 33 | 1 | 1 | 1 | 1 |
| 36 | 1 | 1 | 1 | 1 |
| 39 | 1 | 1 | 1 | 1 |
| 42 | 1 | 1 | 1 | 1 |
| 45 | 1 | 1 | 1 | 1 |
| 48 | 1 | 1 | 1 | 1 |
| 51 | 1 | 1 | 1 | 1 |
| 54 | 1 | 1 | 1 | 1 |
| 57 | 1 | 1 | 1 | 1 |
| 60 | 1 | 1 | 1 | 1 |
| Sec | 42 | 57 | 57 | 36 |
| Amps | 3.333 | 19.167 | 8.333 | 33.333 |
| Amp-Hour | 0.039 | 0.303 | 0.132 | 0.333 |
| Total Amp-Hrs | 0.808 | | | |

| Fuel ON<br>Solenoid | Fuel OFF<br>Solenoid |
|---|---|
| 1 | 0 |
| 1 | 0 |
| 0 | 1 |

| SUS | 7 | | | | | Fuel ON Solenoid | Fuel OFF Solenoid |
|---|---|---|---|---|---|---|---|
| Item Power (w) | | Fuel Pump 80 | Glow Plug 460 | Injector 200 | Starter 800 | | |
| 0 | | | | | | 1 | 0 |
| 3 | | 1 | 1 | 1 | 0 | | |
| 6 | | 1 | 1 | 1 | 0 | | |
| 9 | | 0 | 1 | 1 | 0 | | |
| 12 | | 0 | 1 | 1 | 0 | | |
| 15 | | 0 | 1 | 1 | 0 | | |
| 18 | | 1 | 0 | 0 | 1 | | |
| 21 | | 1 | 1 | 1 | 1 | | |
| 24 | | 1 | 1 | 1 | 1 | | |
| 27 | | 1 | 1 | 1 | 1 | | |
| 30 | | 1 | 1 | 1 | 1 | | |
| 33 | | 0 | 1 | 1 | 0 | 1 | 0 |
| 36 | | 0 | 1 | 1 | 0 | | |
| 39 | | 0 | 1 | 1 | 0 | | |
| 42 | | 1 | 0 | 0 | 1 | | |
| 45 | | 1 | 0 | 0 | 1 | | |
| 48 | | 1 | 1 | 1 | 1 | | |
| 51 | | 1 | 1 | 1 | 1 | | |
| 54 | | 1 | 1 | 1 | 1 | | |
| 57 | | 1 | 1 | 1 | 1 | | |
| 60 | | 1 | 1 | 1 | 1 | 0 | 1 |
| Sec | | 42 | 51 | 51 | 36 | | |
| Amps | | 3.333 | 19.167 | 8.333 | 33.333 | | |
| Amp-Hour | | 0.039 | 0.272 | 0.118 | 0.333 | | |
| Total Amp-Hrs | | 0.762 | | | | | |

77

COLD STARTING AID SYSTEM FOR AN INTERNAL COMBUSTION ENGINE AND METHOD OF START-UP SEQUENCING FOR SAME

This invention relates to a cold starting aid system for internal combustion engines.

BACKGROUND OF THE INVENTION

Air-cooled internal combustion engines are employed in a variety of applications in everyday life, from mopeds to family transport, large trucks, and industrial power plants. Today's engines are designed to operate reliably within a limited temperature range, typically between −20° C. to 40° C. When faced with extreme operating conditions, such as low temperatures, consistent engine start up and operation cannot be relied upon without assistance.

In order to initiate the combustion of an air/fuel mixture in a combustion chamber of an engine, the internal energy of the mixture must be raised to a critical level. For gasoline engines, this is typically accomplished through a compression of the air/fuel mixture and a subsequent ignition supplied by a spark plug. If the engine start up is not achieved immediately, then power, supplied by a battery is used to crank the engine over an extended period of time until the engine starts. In extreme cold conditions, a block heater can sometimes be relied upon, to warm up the engine block and, thereby, raise the internal energy of the fuel and air closest to the combustion chamber, in combination with the compression cycle and the ignition spark. The disadvantages of this start up aid is that it expends energy not used during start up, it requires time to warm up the engine block before starting can be tried, and an external energy source must be used to power the block heater. It is not uncommon for the battery to run out of charge at extreme cold temperatures before achieving start up.

In operation with diesel engines in extreme temperature conditions, raising the internal energy of the air/fuel mixture is accomplished by compression of the air/fuel mixture only, or by compression and the use of an electric glow plug. These starting systems are suitable only for smaller size engines with high compression ratio and high RPM (automobile diesel engines). Larger engines, like the ones of transport trucks, require different starting aids. Some are using the same block heaters as for the gasoline engines. The block heaters are not usually relied upon because of inaccessibility en-route (no external power source to connect the heater). Therefore, at low temperatures, it is not uncommon to leave the engine running rather than risk restart. Also, the use of a block heater is practical where the engine is water-cooled, but in some applications air cooled engines are preferred. The start up of diesel engines can also experience other disadvantages, namely running down of the battery, extended start up times, and excessive use of power resources.

One startup aid for diesel engines is to heat the intake air with fuel-fired (combusting) glow plugs. This starting aid is reliable only if the engine draws excess amounts of air through its intake manifold to supply oxygen to both the fuel fired glow plugs and a fuel charge in the combustion chamber. Otherwise, the fuel-fired glow plug can consume all the oxygen in the air and "starve" the engine.

A particular problem arises where an internal combustion engine is used to drive stationery equipment, e.g. a generator or pump. Such devices are used intermittently and may remain idle or in storage for extended periods. The devices typically are transported to a remote location and the engine must be able to start quickly and reliably without significant preparation.

It is therefore an objective of the present invention to provide a cold starting aid system and a starting method that will obviate or mitigate the above disadvantages.

SUMMARY OF THE INVENTION

In general terms, the present invention relates to a cold start system for internal combustion engines and its method of use. In one aspect of the invention, there is provided a cold start system for an engine having at least one fuel injector and an air intake manifold to supply fuel and air respectively, into a combustion chamber. The cold start system includes at least one heating element to be disposed in the air intake manifold to heat a body of air and at least one heating element to be disposed around the fuel injector to heat the fuel contained therein.

Preferably, a controller, including a series of switches, is used to regulate a supply of power from a battery to the starter, and the plurality of heating elements. The controller is connected to a microprocessor with associated power management software. The software directs the controller by way of a feed back loop connected to an ambient temperature sensor, to select an appropriate heating and cranking cycle. Additional sensors can be incorporated into the controller and include a RPM sensor which detects if the engine has started, an oil pressure sensor which monitors the pressure of the oil, a water sensor which detects if there is water present in the fuel, and a range RPM sensor which detects if the speed of the engine is outside of the normal operating range.

In a preferred embodiment, a fuel pre-heat system consists of a heater body mounted around the fuel injector. The body houses the fuel injector and a thermally conductive gasket may be positioned between the body and the fuel injector, to enhance heat transfer there between. A plurality of heating elements are inserted into a series of holes located around an exterior of the body, which minimizes the distance between the fuel pre-heat system and the combustion chamber.

An air pre-heat system of a preferred embodiment includes a spacer located in the air intake manifold and a plurality of heating elements. A series of ports are preferably located in a peripheral wall of the spacer, into which the heater elements are inserted. A thermal insulator may be positioned between the spacer and the air intake manifold. A plurality of insulating fasteners are used to mount the spacer to the air intake manifold and minimize heat transfer.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
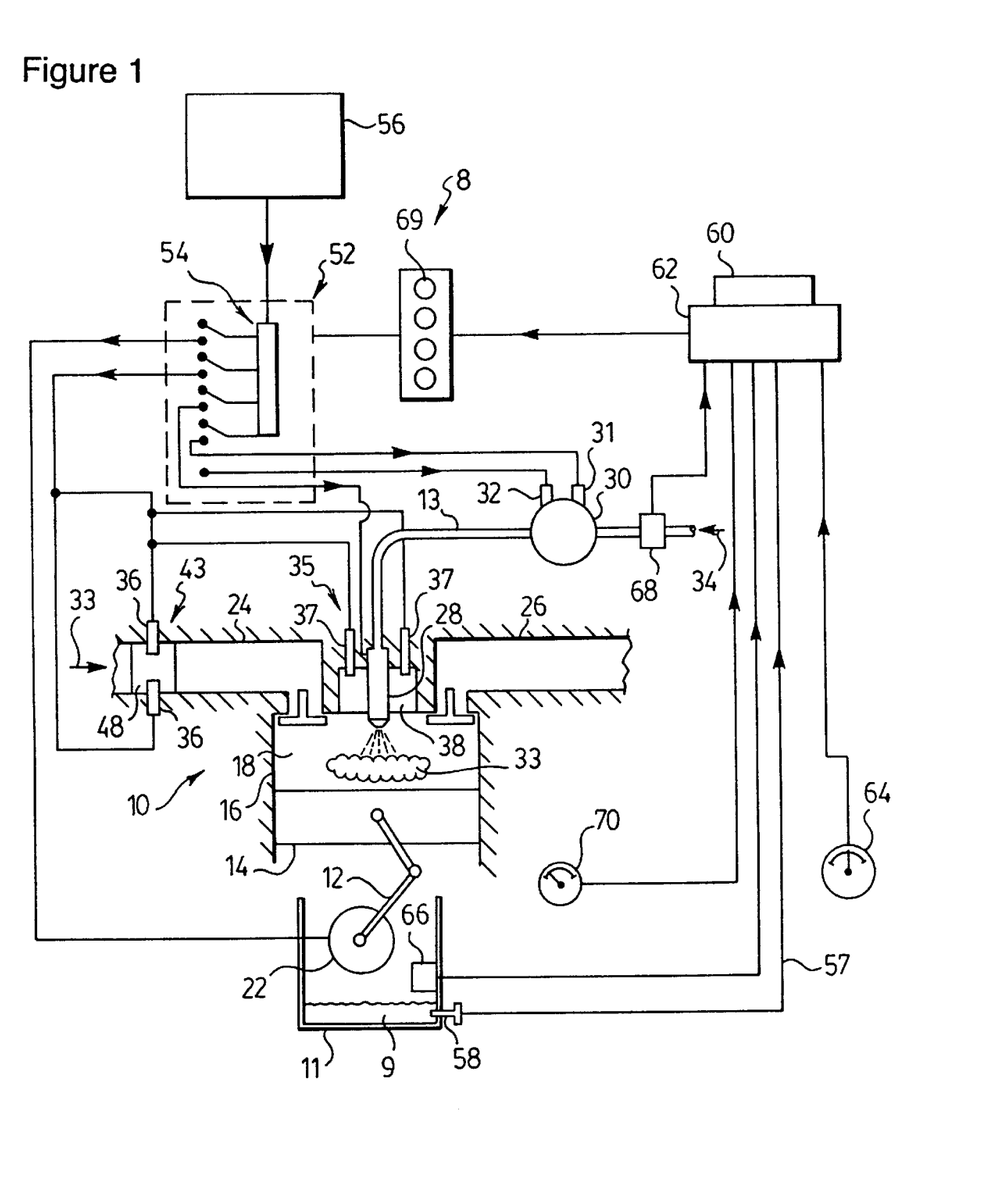
FIG. 1 is a schematic representation of an internal combustion engine including a cold starting aid system.

Referring to FIG. 1, a typical air-cooled internal combustion engine 10 includes a crank case 11, a crank shaft 12 connected to a piston 14 which is housed in a cylinder 16, and a combustion chamber 18 disposed between the piston 14 and cylinder 16. An air intake manifold 24 and an exhaust manifold 26 are connected to the combustion chamber 18. A starter 22 is connected to the crankshaft 12. An electrical fuel pump 30 is connected by fuel lines 13 to a fuel injector 28, which supplies the fuel 34 to the combustion chamber 18. The fuel pump 30 is controlled by a "Fuel ON" solenoid 31, and a "Fuel OFF" solenoid 32, to regulate the supply of electrical power from a battery 56 to the pump 30. The voltage supplied to the system by the battery 56 can be 12 volt DC or 24 volt DC. Incorporated in the engine 10 is a cold starting aid system 8 consisting of a fuel heater 35 distributed around the fuel injector 28 to heat the fuel 34, and an air heater 43 positioned on the air intake manifold 24 to heat the air 33.

Figure 2:
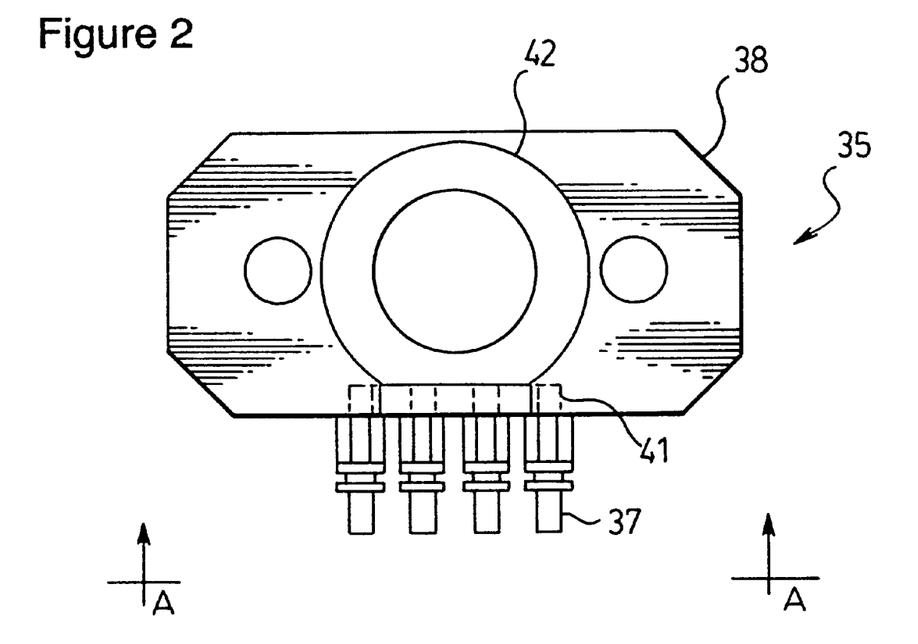
FIG. 2 is a plan view of a fuel heater used in the system of FIG. 1.
Figure 3:
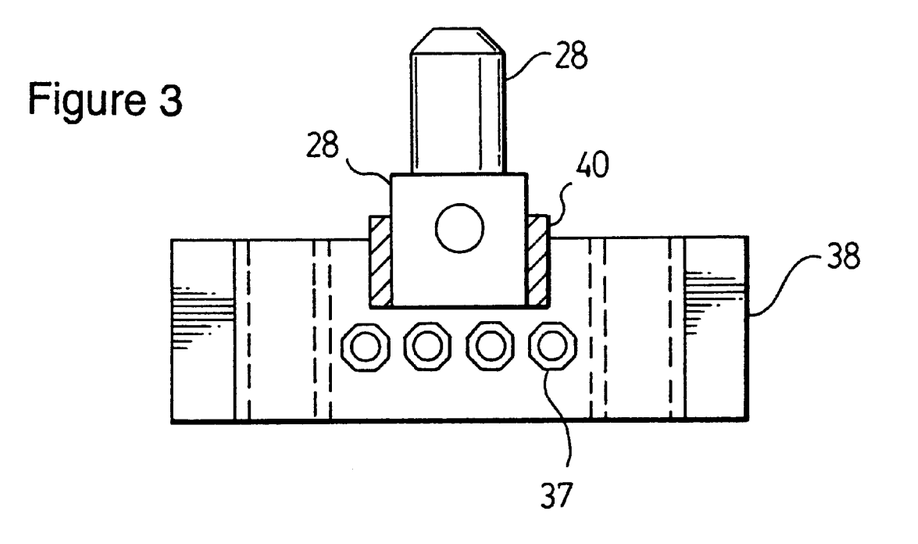
FIG. 3 is a section on the line A—A of FIG. 2.

The fuel heater 35, shown in FIGS. 2 and 3, includes a heater body 38, which is mounted onto the cylinder 16 of FIG. 1, and a recess 42 in the body 38 to encompass the body of the fuel injector 28. A thermally conductive gasket 40 is positioned between the heater body 38 and the injector 28 to enhance the transference of heat therebetween. A plurality of heating elements 37, which in the preferred embodiment are electric Firerod cartridges, are inserted into a plurality of corresponding holes 41 located around an exterior of the heater body 38. These heating elements 37 are powered by the battery 56 of FIG. 1.

Figure 4:
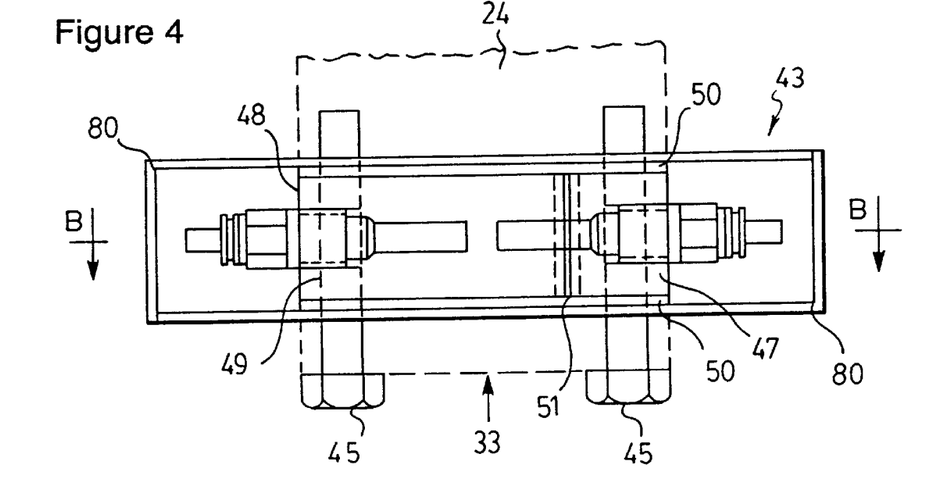
FIG. 4 is a side view of an air heater.
Figure 5:
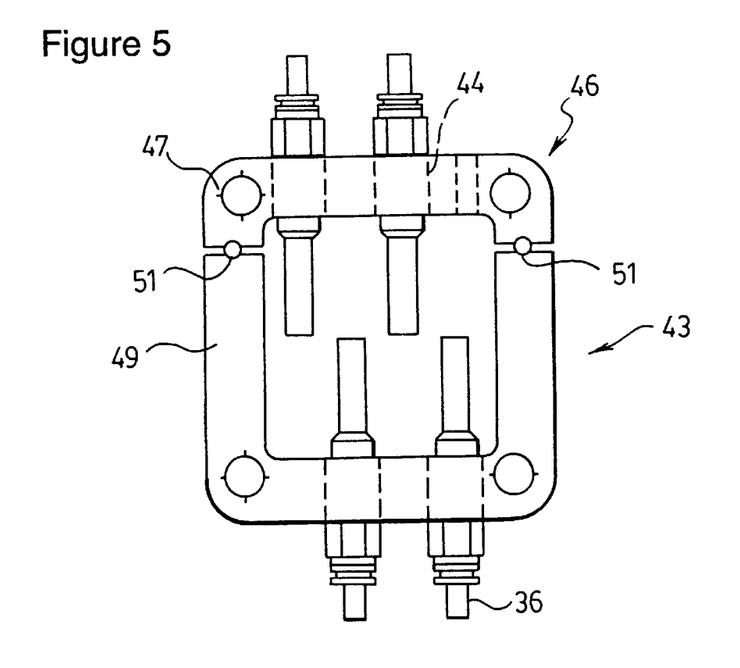
FIG. 5 is a section on the line B—B of FIG. 4.
Figure 6A:
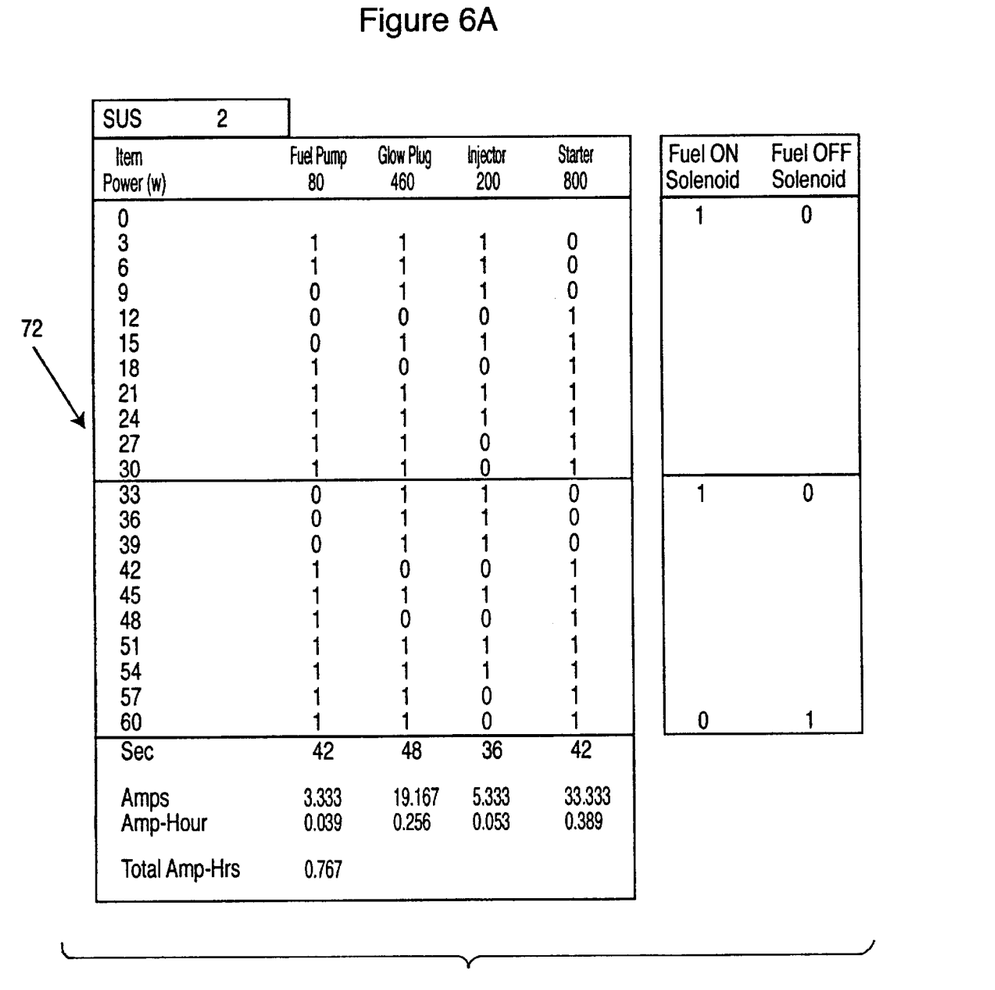
FIG. 6 shows details of start sequences.
Figure 6B:
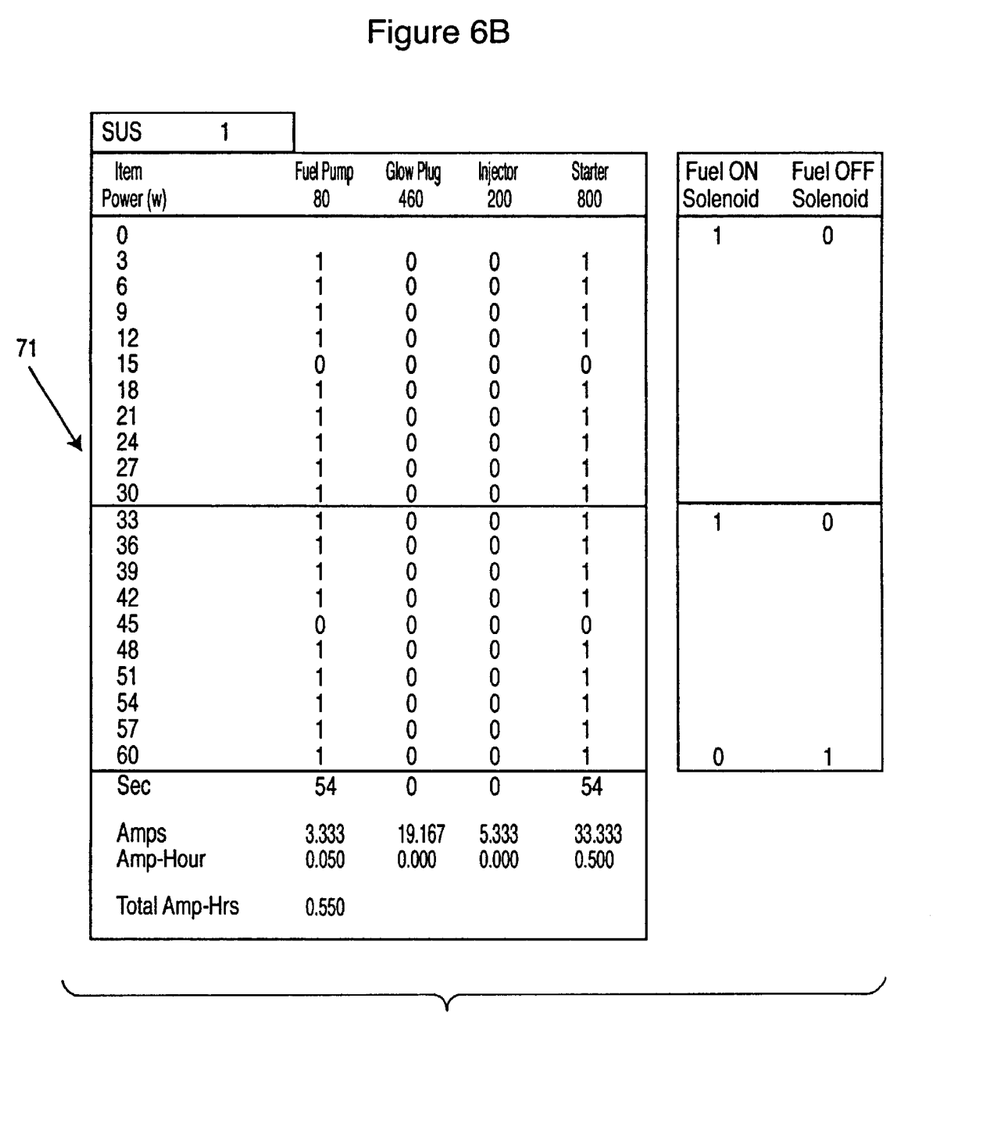
Figure 7A:
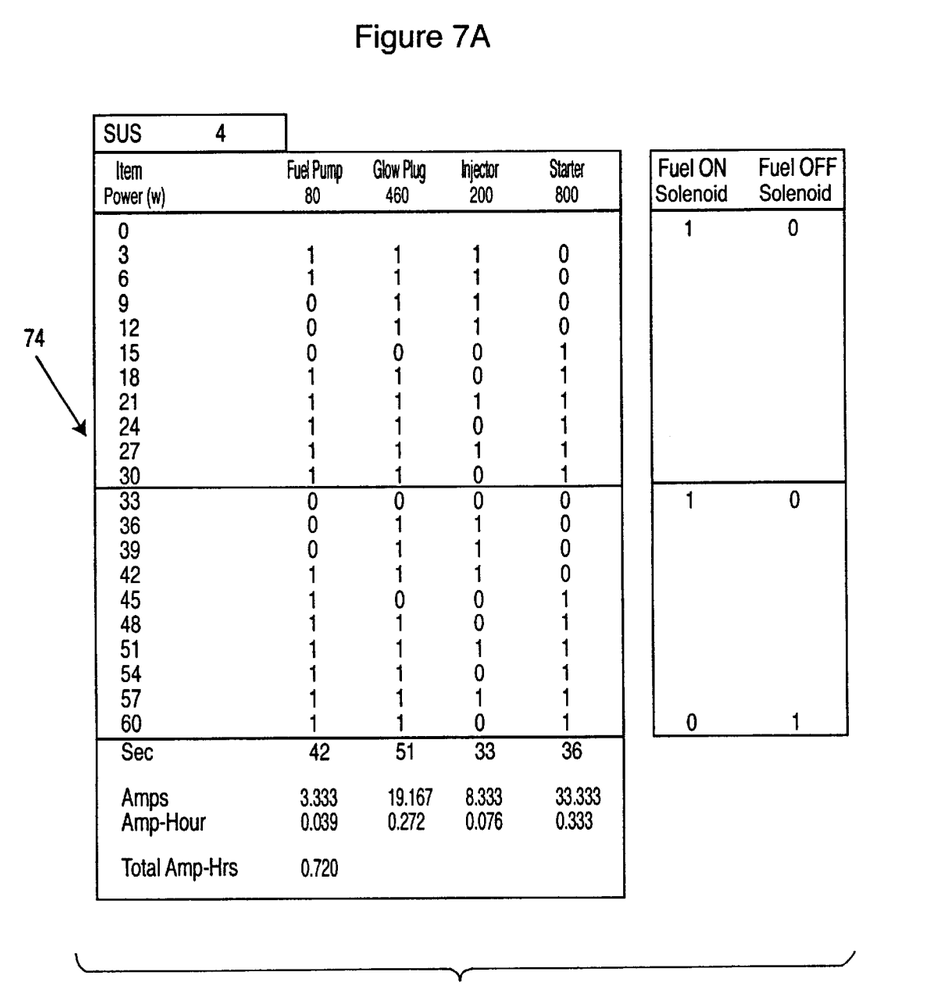
FIG. 7 shows details of start sequences.
Figure 7B:
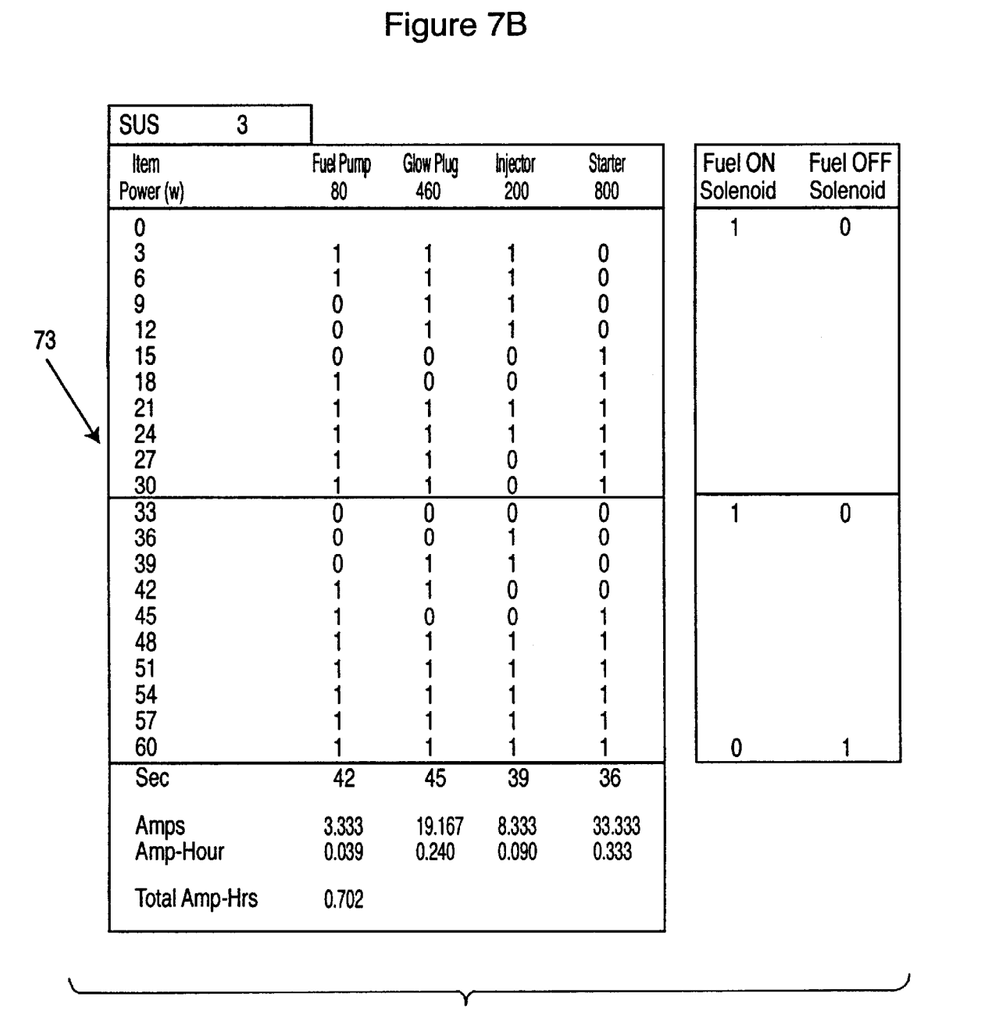
Figure 8A:
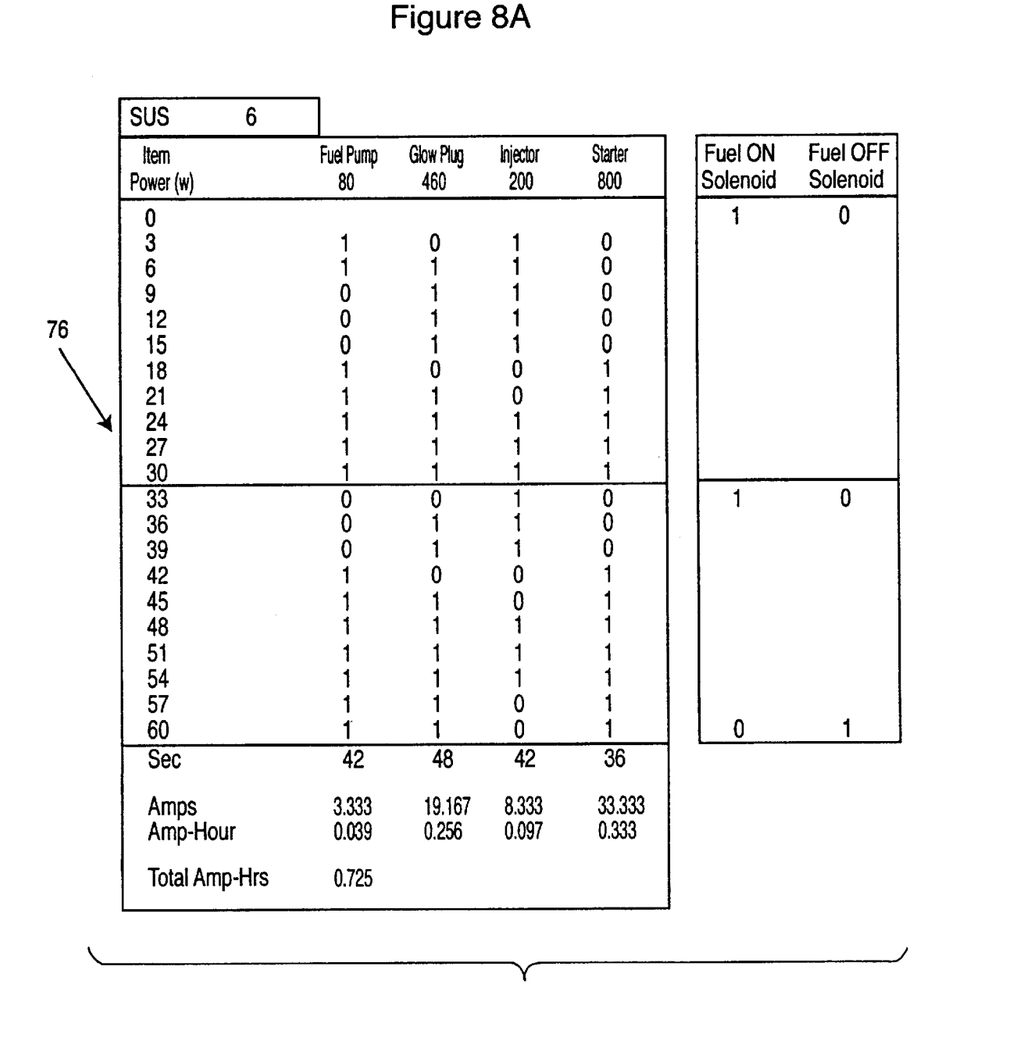
FIG. 8 shows details of start sequences.
Figure 8B:
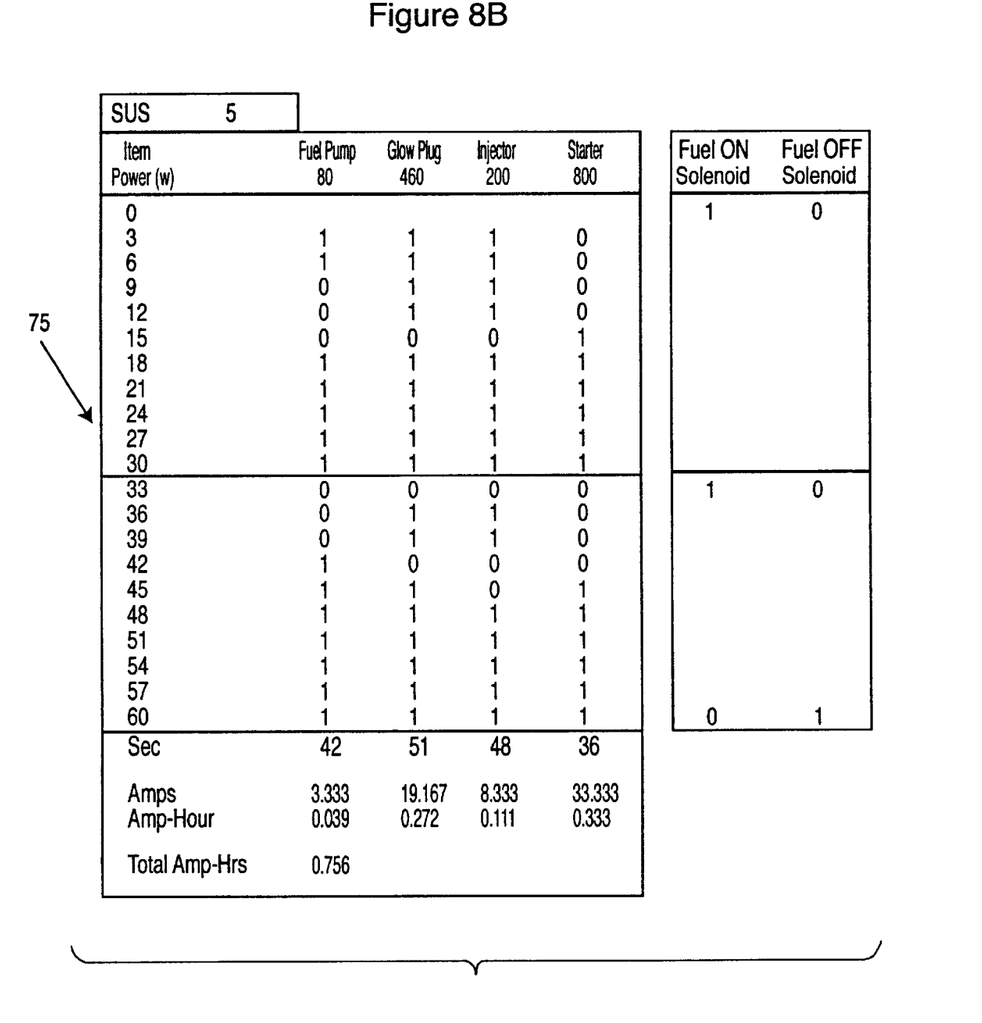

The air heater 43 of the preferred embodiment, shown in FIGS. 4 and 5, includes a spacer 48 and a plurality of heating elements 36. A series of ports 44 are located in a peripheral wall 46 of the spacer 48 in a staggered orientation, into which the heater elements 36 are inserted. In the preferred embodiment, the air heating elements are electric Glow plugs that are powered by a 12 volt DC battery 56. For systems that use 24 volt DC power, the spacer 48 is divided into a first portion 47 and a second portion 49. An electrical insulator 51 is sandwiched between the portions 47, 49, of the spacer 48, in order to separate the electrical grounds of the two portions 47, 49. A thermal insulator 50 is positioned between the spacer 48 and the air intake manifold 24, to help inhibit thermal transfer to the rest of the engine 10, which may act as a thermal heat sink. The same thermal insulator 50 acts as an electrical insulator, which electrically isolates the spacer from the air manifold 24. A wraparound housing 80, made of a thermally conductive material, such as aluminum, is installed on both sides of the spacer 48 in order to protect the heating elements 36 from the inclusion of foreign matter. A plurality of insulating fasteners 45 are used to mount the spacer 48, thermal insulator 50, and wraparound housing 80 to the air manifold 24.

A controller 52, including a series of switches 54, is used to regulate the supply of power from the battery 56 to the starter 22, the "Fuel ON" solenoid 31, the "Fuel OFF" solenoid 32, and the heating elements 36. The controller 52 is connected to a microprocessor with real time clock 62 and is controlled by the associated power management software 60. The software 60 directs the controller 52 by way of a feedback loop 57 connected to a temperature sensor 58 to select an appropriate heating and cranking cycle. The heating/cranking cycle depends on the ambient temperature read by the temperature sensor 58. In the preferred embodiment, the temperature of the oil 9 in the crankcase 11 is monitored for an indication of ambient temperature. Additional sensors can be included to feed various signals into the controller, in order to monitor the engine operation. Examples of additional sensors include a proximity sensor 64 which detects if the engine 10 has started, an oil pressure sensor 66 which monitors the pressure of the oil 9, a water in fuel sensor 68 which detects if there is water present in the fuel 34, and a range RPM sensor 70 which detects if the speed of the engine 10 is outside of the normal operating range. All the run or fault states monitored by the various sensors are indicated on the controller 52 by a series of indicators 69.

The operation of the cold starting aid system 8 in connection with the internal combustion engine 10 is directed by a series of different start up sequences 71, 72, 73, 74, 75, 76, 77 and 78, given in FIGS. 6 through 9. Each of the start up sequences 71–78 provides a different sequence of the operation of the starter 22, fuel pump 30, solenoids 31, 32, and heating elements 36, 37. The sequencing logic of the power management software 60 directs the order in which the components 22, 31, 32, 36, 37 are enabled or disabled, in order to minimize the amount of power required for start up of the engine 10. In certain instances the air 33 and the fuel 34, either simultaneously or separately, are heated for a certain delta time unit before being delivered into the combustion chamber 18. In other instances, the air 33 and fuel 34 are delivered into the combustion chamber 18 without the application of heat.

Figure 9A:
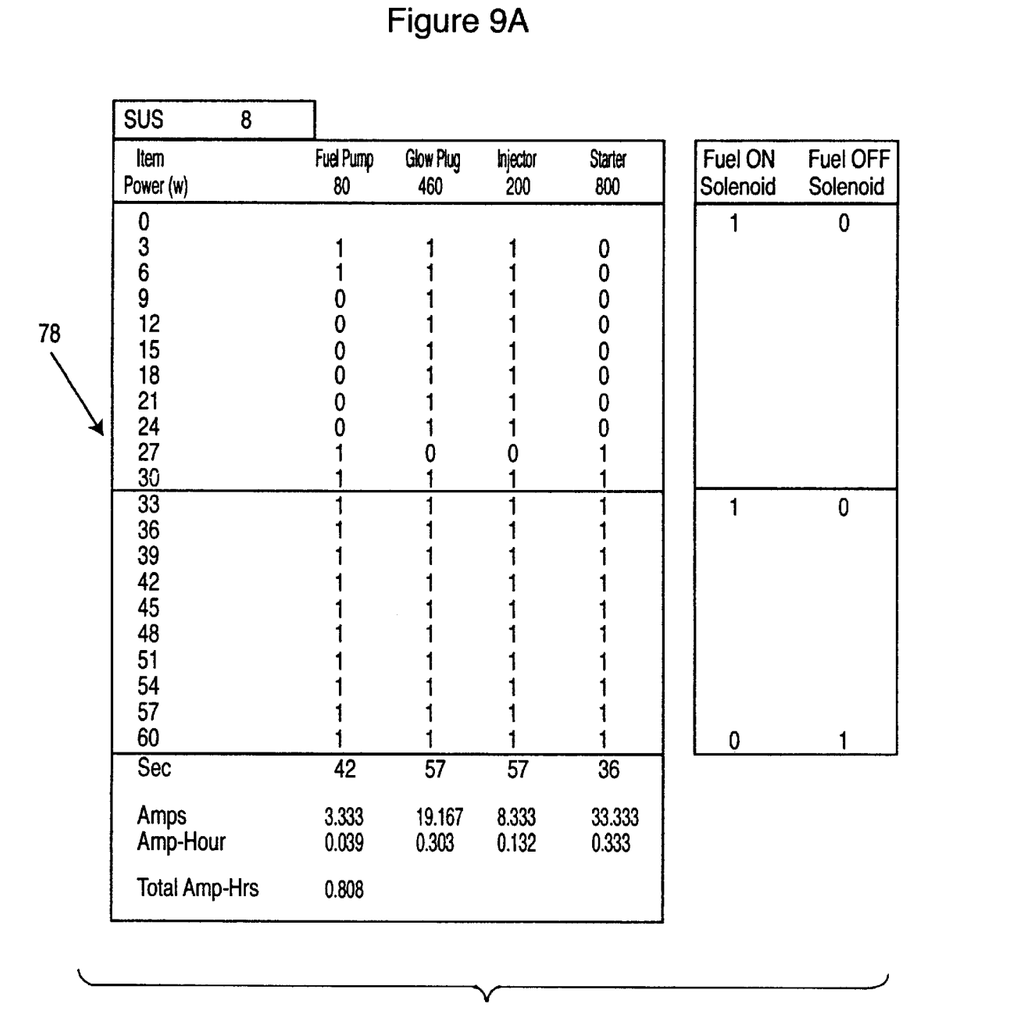
FIG. 9 shows details of start sequences.
Figure 9B:
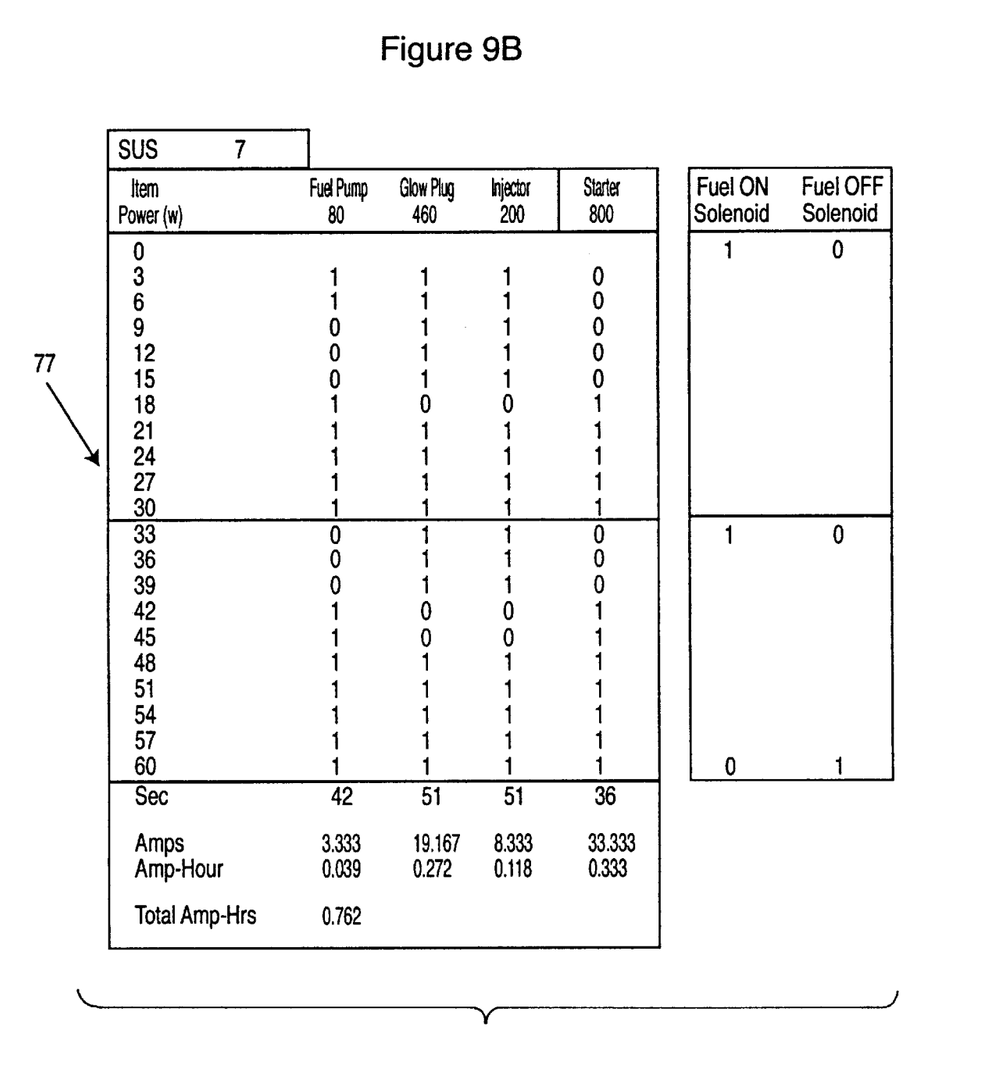

The power management software 60 selects which of the particular startup sequences 71–78 is followed, preferably based on the ambient temperature measured by the temperature sensor 58 in the oil 9. By way of example only, an outline of the start up sequence 77 for the temperature range −32° C. to −41° C. shown in FIG. 9 is now described.

For the first six seconds the starter 22 is de-energized and the fuel pump 30 and the air and fuel heaters 35, 43 are energized, thereby heating the air 33 situated near the spacer 48 and heating the fuel 34 deposited into the fuel injector 28 by the pump 30, before the crankshaft 12 is rotated. After the sixth second until the end of the fifteenth second the fuel pump 30 is de-energized, the starter 22 remains de-energized, and the fuel and air heating systems 35, 43 remain energized, thereby further heating of the air 33 near the spacer 48 and heating of the fuel 34 retained in the injector 28. After the fifteenth second until the end of the eighteenth second the fuel pump 30 is energized, the fuel and air heating systems 35, 43 are de-energized, and the starter 22 is energized, thereby allowing the pre-heated air 33 and the pre-heated fuel 34 to be drawn into the combustion chamber 18 as the crankshaft 12 is rotated. Further amounts of fuel 34 and air 33 supplied to the combustion chamber 18 are not pre-heated. After the eighteenth second until the end of the thirtieth second all the components 30, 35, 43 and 22 are energized, whereby the fuel 34 and the air 33 are heated as they flow into the combustion chamber 18, during rotation of the crankshaft 12. If the engine 10 starts, the proximity sensor 64 detects the increase in speed and directs the controller 52 to stop the heating and cranking cycle.

If after the thirtieth second the engine 10 has not started, the fuel pump 30 and the starter 22 are de-energized while the fuel and air heating systems 35, 43 remain energized until the thirty ninth second. These systems 35, 43 continue to pre-heat the air 33 situated in the vicinity of the spacer 48 and the fuel 34 retained in the injector 28, before the crankshaft 12 is further rotated. After the end of the thirty ninth second until the end of the forty fifth second the fuel pump 30 and starter 22 are energized and the fuel and air heating systems 35, 43 are de-energized, thereby supplying the pre-heated air 33 and the pre-heated fuel 34 to the combustion chamber 18, during crankshaft 12 rotation. Further amounts of fuel 34 and air 33 supplied to the combustion chamber 18 are not pre-heated. After the forty fifth second until the end of the sixtieth second all the components 30, 35, 43, and 22 are energized, whereby the air 33 and fuel 34 supplied to the combustion chamber 18 are pre-heated as the crankshaft 12 is rotated.

The start-up sequence 77 is completed after the end of the sixtieth second, where by this point if the engine 10 has not started the sequence 77 can be repeated up to four times. The proximity sensor 64 will interrupt the start up sequence 77, once the engine 10 has started, at any time during the ignition process. The other sensors 66, 68, and 70 can also interrupt the ignition process.

Different ambient temperatures will initiate different sequences as indicated by the sequences 71–76 and 78 where a "1" indicates an energized state and "0" indicates a de-energized state. It should be noted that sequence repetition and interruption is experienced by the other startup sequences 71–76 and 78 as well.

The cold starting aid system 8 can be used with 12 volt DC and 24 volt DC batteries 56. The fuel heating elements 37 in the preferred embodiment are electric Firerod cartridge plugs and are preferably pressed into the holes 41 of the heater body 38. The heater body 38 is made of a conductive material, such as aluminum. The gasket 40 between the body 38 and injector 28 is made of a silicone based compound containing zinc oxide, such as Wakefield Engineering Thermal Joint Compound, which is typically malleable in order to fill in the space between the body 38 and injector 28. Placement of the fuel heater 35 around the fuel injector 28 minimizes the distance between the heater 35 and the combustion chamber 18, shown in FIG. 1. This results in heating of the fuel 34 closest to the combustion chamber 18 which inhibits the potential risk of vaporizing the fuel 34 in the fuel lines 13, whereby vapor lock can occur. The air heating elements 36 in the preferred embodiment, are electric Glow plugs and are preferably threaded into the ports 44 of the spacer 48. The use of non-combusting heaters 36 in the air intake 24 ensures that the air 33 is heated without depleting the oxygen in the air 33 inside the intake manifold 24. The thermal insulator 50, the electrical insulator 51, and the fastener 45 are made of an insulating material such as Teflon.

During testing, the heat output of the four Fireroad cartridges used as fuel heating elements 37 to heat the fuel 34 in the vicinity of the fuel injector 28, reached a maximum of 200 watts in less than 4 seconds. The four Glow plugs used as air heating elements 36, for the air heater 43, obtained a maximum heat output of 480 watts in less than 4 seconds. The amount of heat generated to heat the fuel 34 and air was adequate and enough to produce a reliable engine start in less than one minute, and a sustained operation for all ambient temperature ranges investigated.

All of the start up sequences 71–78 are typically of one minute in duration. These ignition processes can be repeated up to four times and are interruptible if the proximity sensor 64 detects that the engine 10 has started. The oil temperature ranges tested were 140° C. to 4° C. for sequence 71, 4° C. to −4° C. for sequence 72, −4° C. to −12° C. for sequence 73, −12° C. to −18° C. for sequence 74, −18° C. to −25° C. for sequence 75, −25° C. to −32° C. for sequence 76, −32° C. to −41° C. for sequence 77, and −41° C. to −55° C. for sequence 78. The temperature of other mediums, such as the ambient air, can also be used as input to the power management software 60.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A cold start system for an engine having at least one fuel injector for supplying fuel to a combustion chamber and an air intake manifold for supplying air to a combustion chamber, said cold start system including at least one heating element to be disposed on said injector for heating the fuel contained therein, said heater is adapted to encompass a body of said injector, said heater includes a body and at least one electrical heating element disposed in said body, said heater includes a heat conductive gasket to be interposed between said body and said injector, said body includes a recess for receiving said injector and a plurality of electrical heating elements are located in said body adjacent to said recess for transferring heat to said injector.

2. A cold start system according to claim 1, further comprising a controller for monitoring the operation of said system.

3. A cold start system according to claim 2, wherein said controller manages a plurality of switches for monitoring the cyclic operation of said heating elements and said heater.

4. A cold start system for an engine having at least one fuel injector for supplying fuel to a combustion chamber and an air intake manifold for supplying air to a combustion chamber, said cold start system including at least one heating element to be disposed on said injector for heating the fuel contained therein, said heating element disposed is electrically activated, a spacer for mounting in said manifold, said spacer having a peripheral wall and said heating element being located on said peripheral wall.

5. A cold start system according to claim 4, wherein said heating elements are distributed on said peripheral wall and project inwardly therefrom for providing uniform heating of air within said manifold.

6. A cold start system according to claim 4, wherein said spacer is divided into first and second portions and an insulator is interposed between said portions for inhibiting electrical transfer therebetween.

7. A cold start system according to claim 4 including thermally insulating gaskets on opposite sides of said spacer, whereby said spacer is thermally isolated from said manifold.

8. A cold start system according to claim 4 further comprising a housing adjacent to said spacer for inhibiting contact of foreign matter with said heating elements.

9. A cold start system according to claim 4 including a plurality of insulating fasteners to couple said spacer to said manifold.

10. A cold start system according to claim 2, wherein said controller varies operation of said heating elements and said heater in response to variations in ambient temperature.

11. A cold start system according to claim 2, wherein said controller comprises a microprocessor with a real time clock and associated software for managing an appropriate start up cycle.

12. A cold start system for an engine having at least one fuel injector for supplying fuel to a combustion chamber and an air intake manifold for supplying air to a combustion chamber, said cold start system including at least one heating element to be disposed on said injector for heating the fuel contained therein, said heating element disposed is electrically activated, a controller for monitoring the operation of said system, wherein said controller monitors predetermined operating parameters and is operable to inhibit operation of the engine in the event that a sensed parameter is outside of a predetermined operating range.

13. A cold start system according to claim 12, wherein said sensed parameter is selected from a group comprising information from a proximity sensor, oil temperature, oil pressure, engine rpm, and the presence of water in the fuel.

14. A cold start system according to claim 13 further including an indicator to show said sensed parameter outside of said predetermined operating range.

15. A cold start system according to claim 14, wherein said indicator is a light.

16. A cold start system according to claim 2, wherein a controller initiates the operation of said heating elements and said heater and terminates said operation after a predetermined interval.

17. A cold start system for an engine having at least one fuel injector for supplying fuel to a combustion chamber and an air intake manifold for supplying air to a combustion chamber, said cold start system including at least one heating element to be disposed on said injector for heating the fuel contained therein, said heating element disposed is electrically activated, a controller for monitoring the operation of said system, said controller monitors an operation of said fuel pump and a supply of fuel to said injector during operation of said heating element and said heater.

18. An air cooled internal combustion engine comprising a crankshaft; a piston operably associated with said crankshaft and reciprocal within a cylinder; a combustion chamber formed between said piston and cylinder; an air intake system for supplying combustion air to said combustion chamber including a manifold and at least one heating element disposed in said manifold; a fuel injection system for supplying fuel to said combustion chamber and including a fuel injector, a fuel pump for delivering fuel to said injector and a heater disposed on said injector for heating the fuel contained therein; a starter for rotating said crankshaft; and a controller for monitoring operation of said heating element, said heater and said starter; whereby the starting of said engine is facilitated, said controller inhibits operation of said fuel pump during operation of said heating element and said heater.

19. An air cooled internal combustion engine comprising a crankshaft; a piston operably associated with said crankshaft and reciprocal within a cylinder; a combustion chamber formed between said piston and cylinder; an air intake system for supplying combustion air to said combustion chamber including a manifold and at least one heating element disposed in said manifold; a fuel injection system for supplying fuel to said combustion chamber and including a fuel injector, a fuel pump for delivering fuel to said injector and a heater disposed on said injector for heating the fuel contained therein; a starter for rotating said crankshaft; and a controller for monitoring operation of said heating element, said heater and said starter; whereby the starting of said engine is facilitated, said controller inhibits operation of said fuel pump during operation of said heating element and said heater.

20. An air cooled internal combustion engine comprising a crankshaft; a piston operably associated with said crankshaft and reciprocal within a cylinder; a combustion chamber formed between said piston and cylinder; an air intake system for supplying combustion air to said combustion chamber including a manifold and at least one heating element disposed in said manifold; a fuel injection system for supplying fuel to said combustion chamber and including a fuel injector, a fuel pump for delivering fuel to said injector and a heater disposed on said injector for heating the fuel contained therein; a starter for rotating said crankshaft; and a controller for monitoring operation of said heating element, said heater and said starter; whereby the starting of said engine is facilitated, said heating element is an electrically operated element disposed in said manifold.

21. A method of starting an internal combustion engine having an intake manifold for supplying air to a combustion chamber and a fuel injector for supplying fuel to said combustion chamber, said method comprising the steps of: heating of air in said manifold for a predetermined time period; heating of fuel in said injector for a predetermined time period; and operating a starter for delivering said air and said fuel into said combustion chamber for initiating combustion, sensing an ambient temperature and selecting one of a plurality of said predetermined time periods.

22. A method of starting an internal combustion engine having an intake manifold for supplying air to a combustion chamber and a fuel injector for supplying fuel to said combustion chamber, said method comprising the steps of: heating of air in said manifold for a predetermined time period; heating of fuel in said injector for a predetermined time period; and operating a starter for delivering said air and said fuel into said combustion chamber for initiating combustion, inhibiting operation of said starter during said heating.

23. A method of starting an internal combustion engine having an intake manifold for supplying air to a combustion chamber and a fuel injector for supplying fuel to said combustion chamber, said method comprising the steps of: heating of air in said manifold for a predetermined time period; heating of fuel in said injector for a predetermined time period; and operating a starter for delivering said air and said fuel into said combustion chamber for initiating combustion, inhibiting said heating of said fuel during operation of said starter.

24. A method of starting an internal combustion engine having an intake manifold for supplying air to a combustion chamber and a fuel injector for supplying fuel to said combustion chamber, said method comprising the steps of: heating of air in said manifold for a predetermined time period; heating of fuel in said injector for a predetermined time period; and operating a starter for delivering said air and said fuel into said combustion chamber for initiating combustion, inhibiting said heating of said air during operation of said starter.

25. A method of starting an internal combustion engine having an intake manifold for supplying air to a combustion chamber and a fuel injector for supplying fuel to said combustion chamber, said method comprising the steps of: heating of air in said manifold for a predetermined time period; heating of fuel in said injector for a predetermined time period; and operating a starter for delivering said air and said fuel into said combustion chamber for initiating combustion, indicating to a user a plurality of operational states of said engine.

* * * * *